Aug. 4, 1931.  J. W. BRYCE  1,817,434
TABULATING MACHINE
Filed Aug. 20, 1925  10 Sheets-Sheet 1
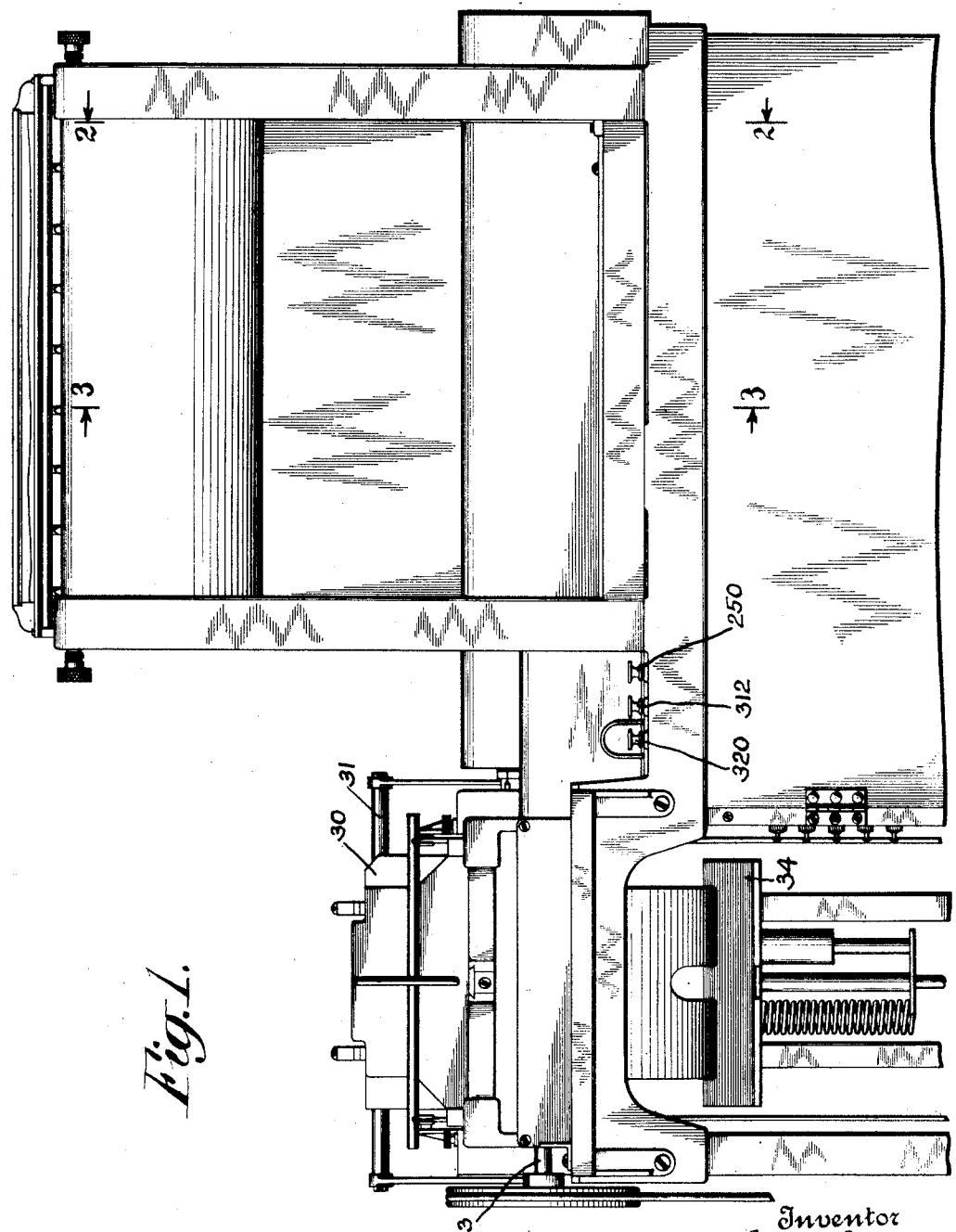

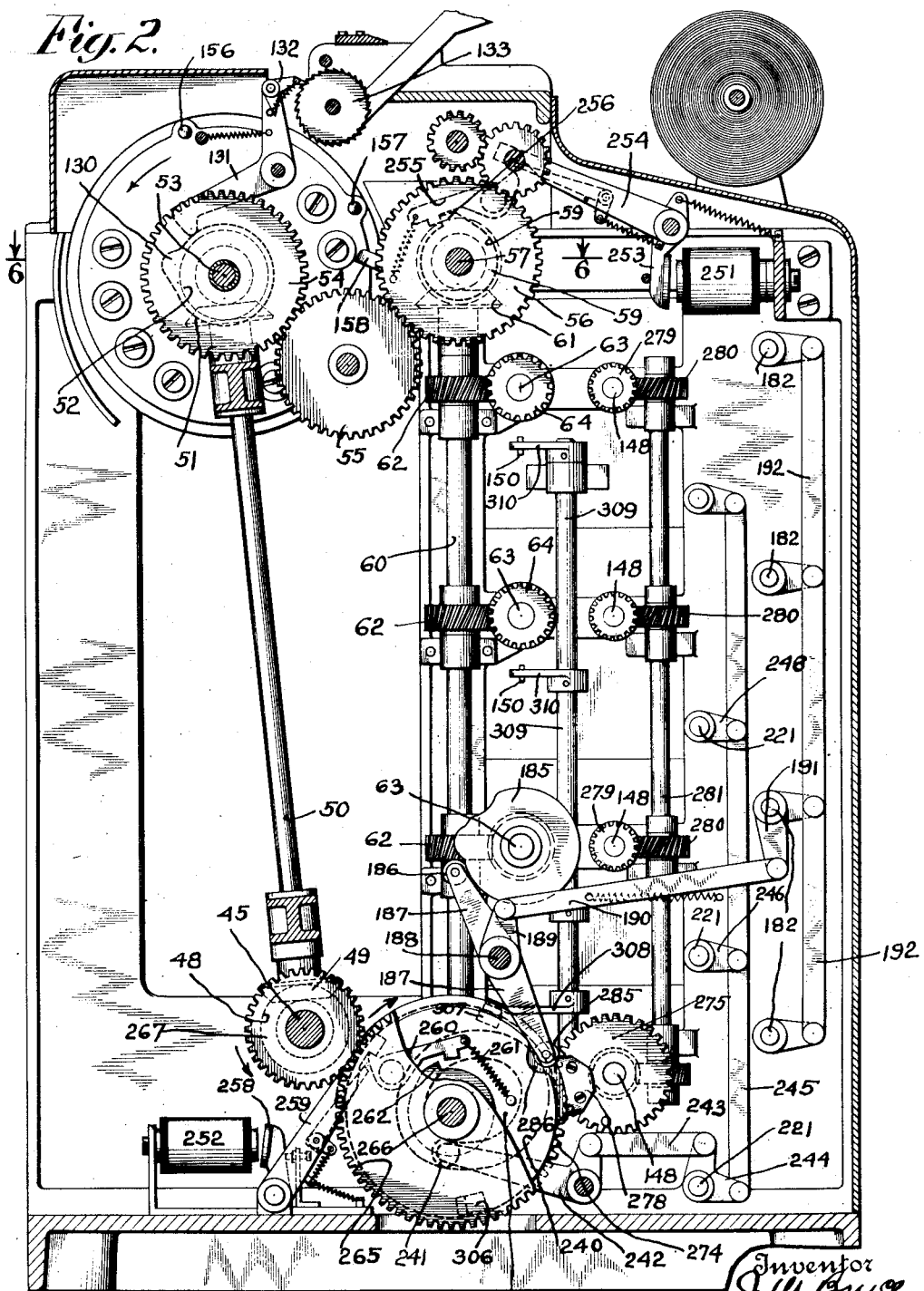

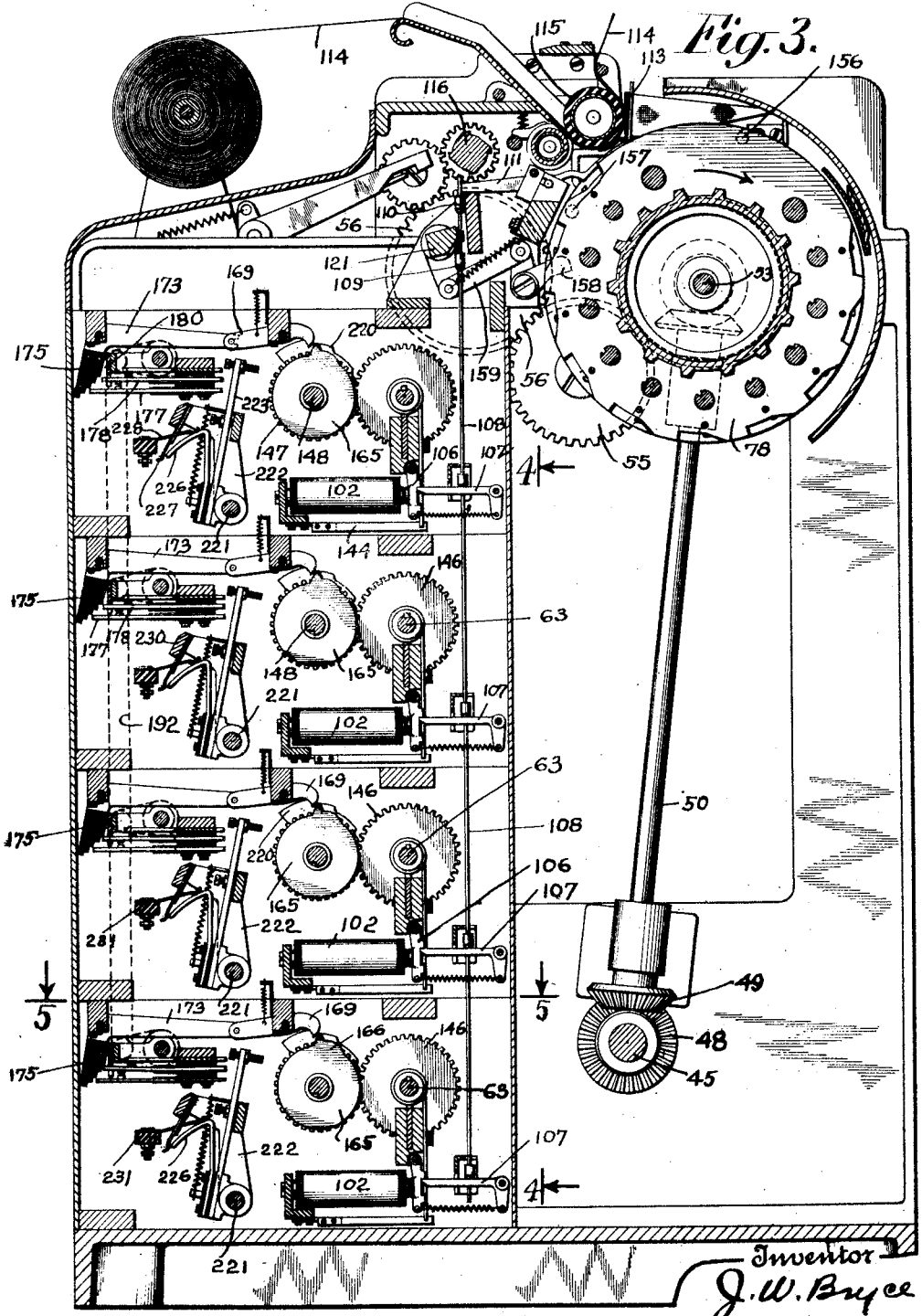

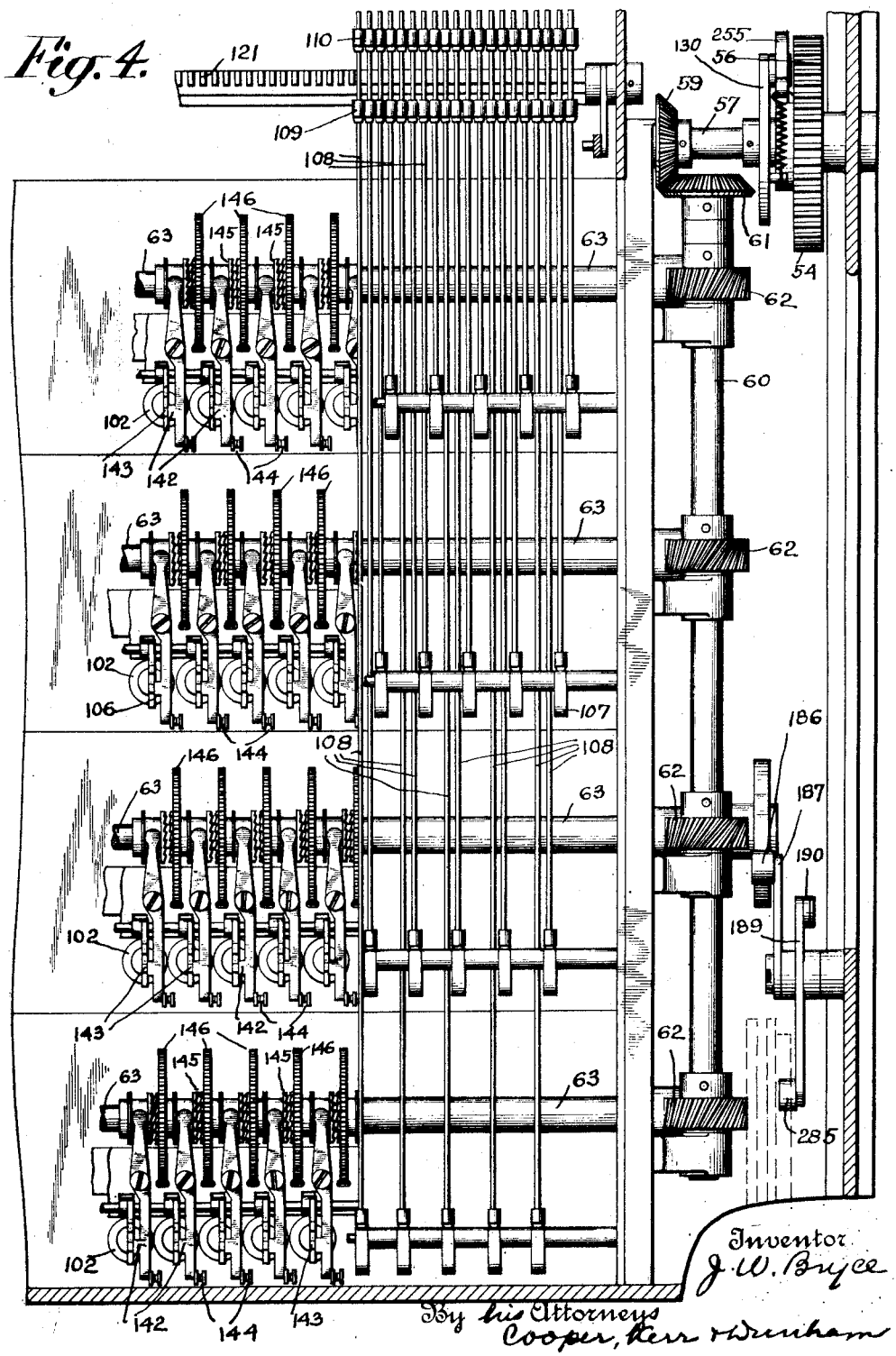

Aug. 4, 1931. J. W. BRYCE 1,817,434
TABULATING MACHINE
Filed Aug. 20, 1925 10 Sheets-Sheet 5
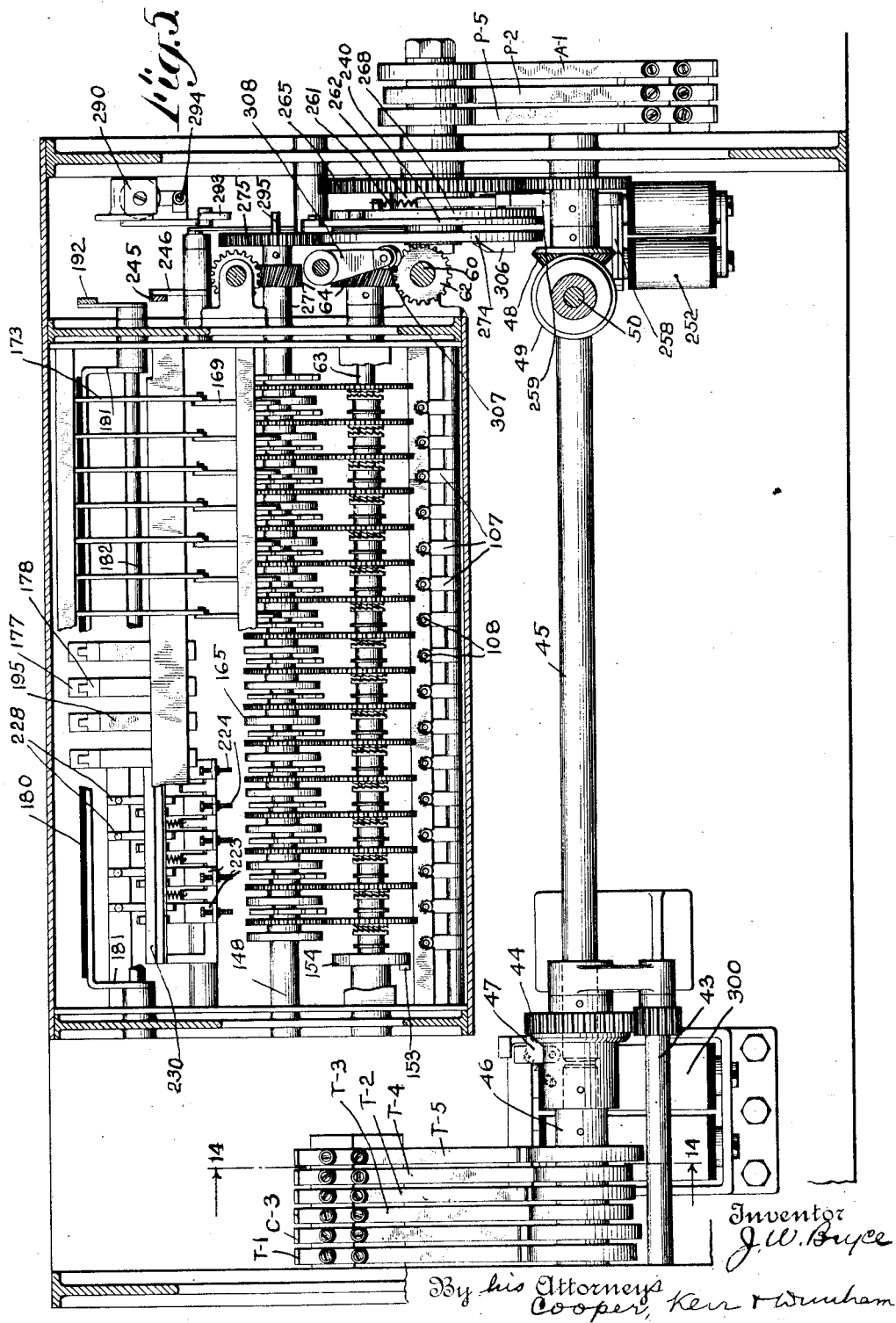

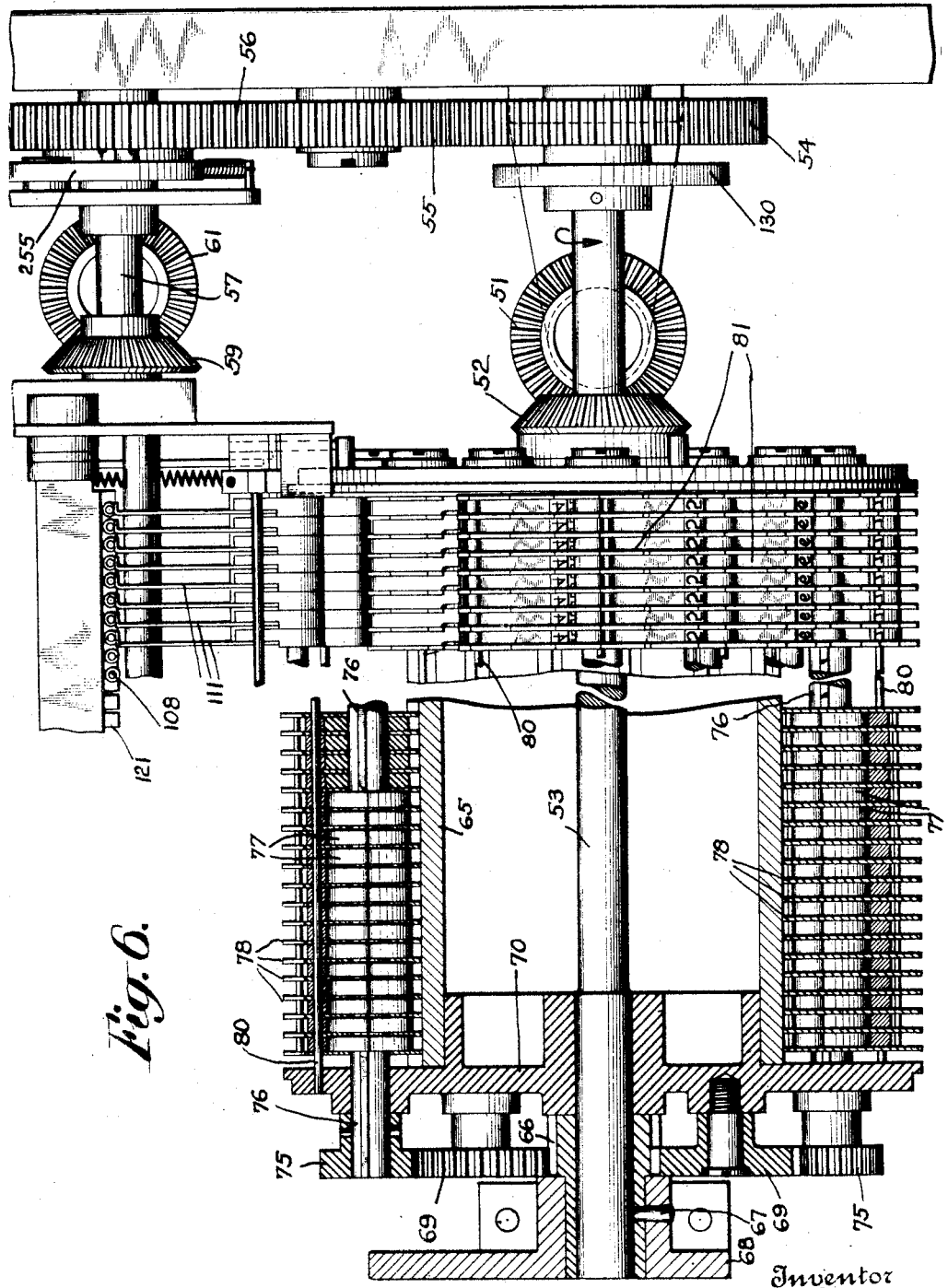

Aug. 4, 1931.                J. W. BRYCE                1,817,434
                         TABULATING MACHINE
                  Filed Aug. 20, 1925    10 Sheets-Sheet 7
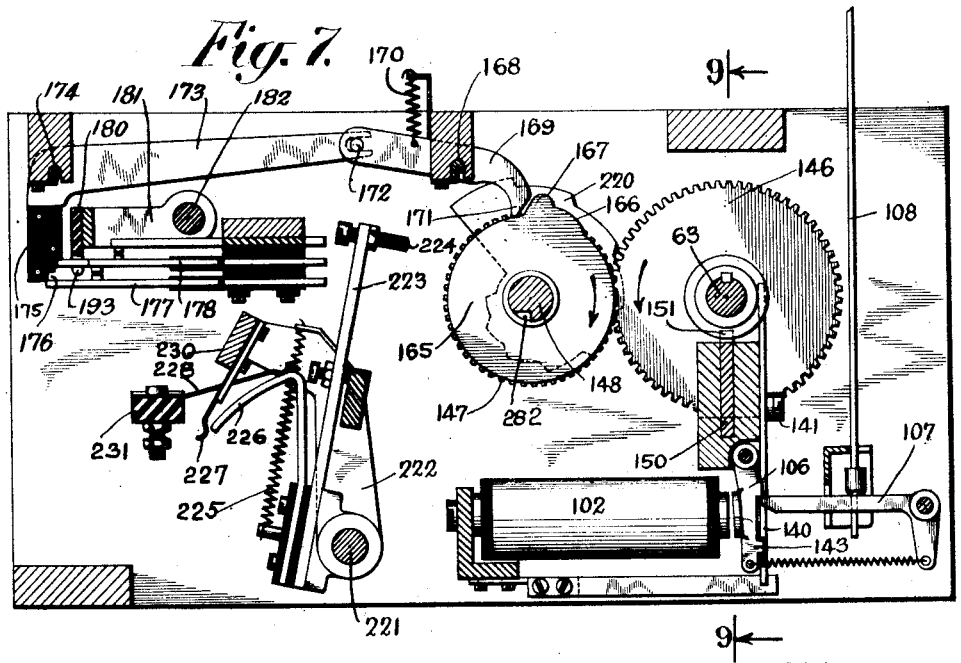
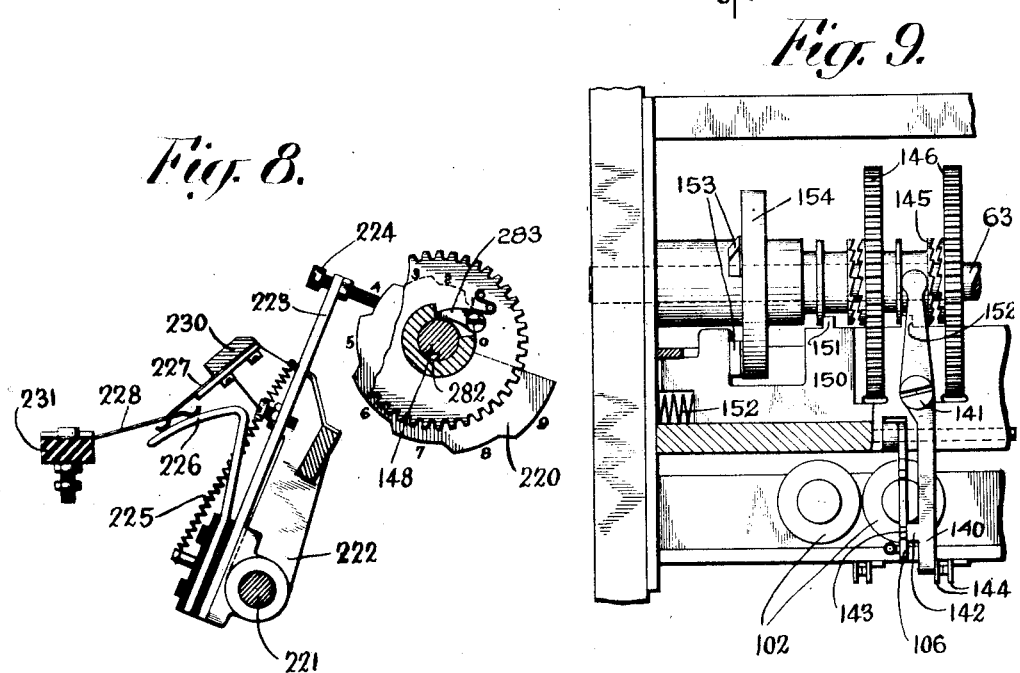
Inventor
J. W. Bryce
By his Attorneys
Cooper, Kerr & Dunham Aug. 4, 1931.  J. W. BRYCE  1,817,434
TABULATING MACHINE
Filed Aug. 20, 1925  10 Sheets-Sheet 8

Inventor
J. W. Bryce
By his Attorneys
Cooper, Kerr & Dunham

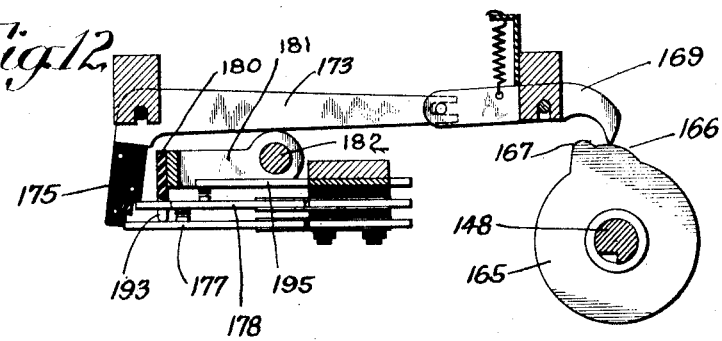
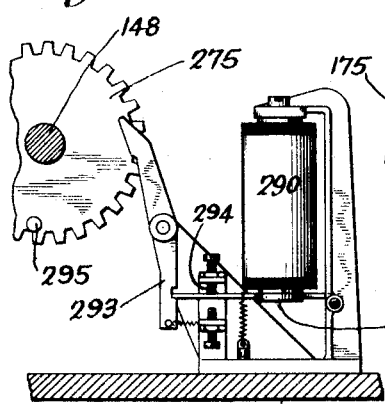
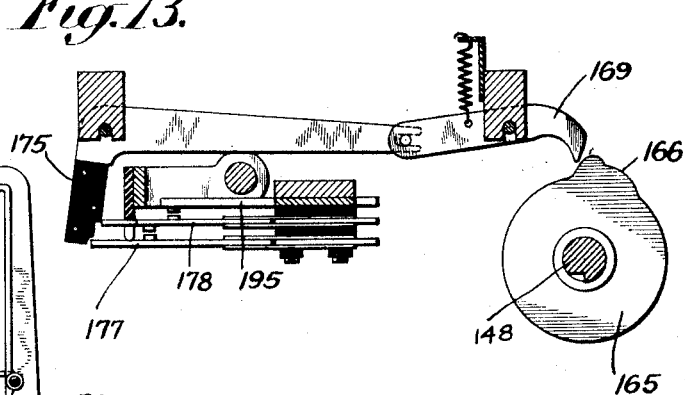
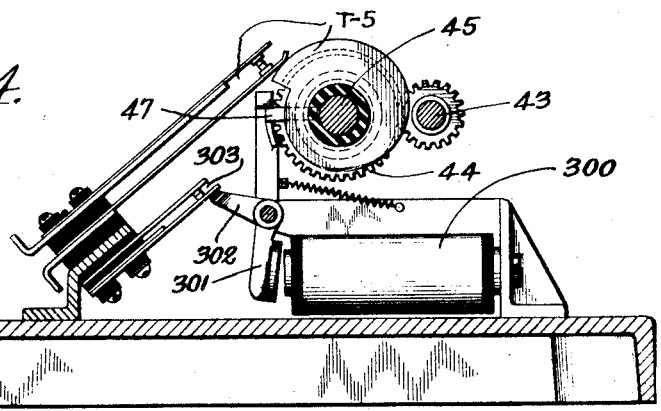

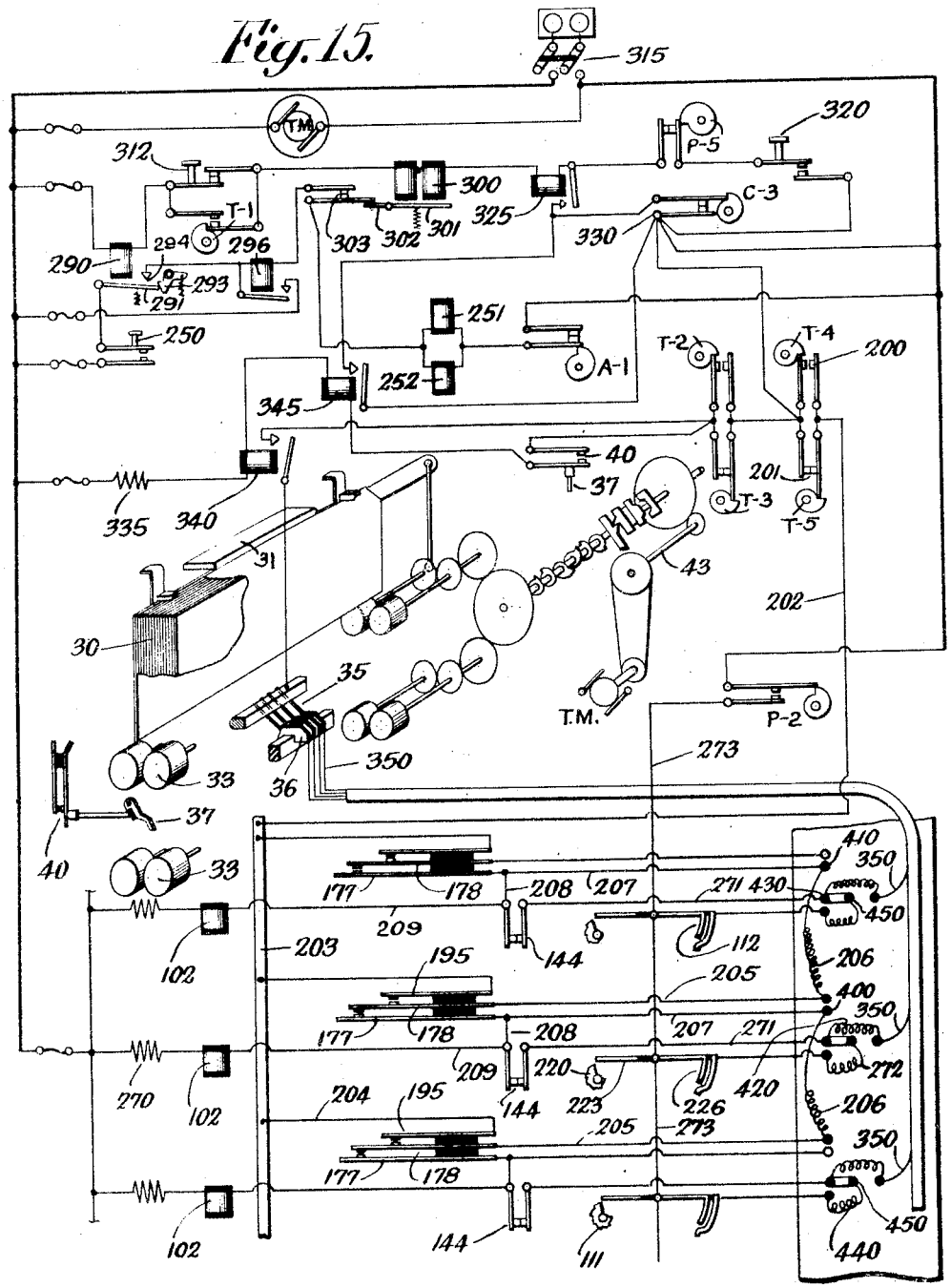

Patented Aug. 4, 1931

1,817,434

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

TABULATING MACHINE

Application filed August 20, 1925. Serial No. 51,276.

This invention pertains to record-controlled tabulating machines and comprises an accumulator suitable for use in connection with the drum printer disclosed in Patent 1,516,079, issued November 18, 1924, to Fred M. Carroll.

The Carroll machine is designed for listing (printing) only, and has no provision for accumulating or printing totals. The type spacing on the printing drum is approximately $\frac{5}{32}$ inch and it has heretofore been difficult to get a single accumulator which would line up with the Carroll type and be capable of operating at the high speed of the Carroll machine.

The object of the present invention is to combine the high speed Carroll printer with the high speed Hollerith accumulating cycle, which, as is well known, comprises means for analyzing cards in motion, together with accumulating means consisting of clutching devices which differentially engage constantly rotating actuators.

In general, my machine comprises a plurality of shafts placed one above the other and each carrying a plurality of accumulator units, or elements, the units on each shaft being set in staggered relationship with those on the other shafts, and so arranged with reference to the printing drum that each element, instead of being restricted to the width of a single type space or $\frac{5}{32}$ inch, is permitted to occupy, in the embodiment herein shown, four times the width of a single type, or $\frac{5}{8}$ inch, which is ample for rugged construction.

I provide four accumulator shafts, one above the other and each carrying a plurality of elements. The units wheel is usually on the upper shaft, the tens wheel on the next shaft below, the hundreds wheel (element) on the third shaft and the thousands wheel on the bottom shaft. The ten thousands wheel is on the upper shaft, the hundred thousands wheel on the second shaft, and so on. For example if we have the number 1,234,567,890, the 0, 6, and 2 will be on the upper shaft, the 9, 5, and 1 on the second shaft, the 8 and 4 on the third shaft, and the 7 and 3 on the bottom shaft.

With such an arrangement of counters, especially operating at high speed, it is practically impossible to effect mechanical transferring from one wheel to the next so I use the electric transfer devices of C. D. Lake Patent 1,372,965, which enables me to transfer or carry from any accumulator element to the next, regardless of the fact that they are on separate shafts, and to do the transferring at very high speed.

As my elements are not arranged in predetermined sets it is not necessary that the element on the extreme right be used for units, but, if desired, any wheel may be used for units regardless of its location, in which case the tens, hundreds, thousands, and succeeding orders of digits will usually be stepped along on the succeeding shafts to the left, as above described. However, it is not necessary that successive elements be used for successive orders of digits, for, as will later appear, I can skip one or more elements so that, for instance, if the units wheel is in the third column the tens wheel is not necessarily in the fourth column, but may be in the fourth or fifth, or any desired column to the left of the units wheel. This is accomplished by the use of the invention disclosed in copending application of J. W. Bryce, Serial No. 721,504, now issued as Patent No. 1,723,499, which is an improvement on the Lake patent above referred to.

Another object of my invention is to provide means whereby the totals may be printed in any field not otherwise occupied on the record sheet, regardless of the location of the field in which the items were listed.

My electric transfer devices effect transfer on all orders simultaneously and are not subject to the "lag" or slow action of ordinary transfer systems so I do not find it necessary to arrange my accumulator elements in sets, but can place as many units as desired on my shafts and use them as desired, either all together or divided into sets or groups as best suits the work.

Another object of my invention is to use a single magnet for each accumulator element to effect both adding and printing.

Other objects and advantages of my present design will be set forth in the accompanying specification and claims and will be shown in the drawings, which by way of illustration show what I now consider to be the preferred embodiment of the invention.

In the drawings,

Fig. 1 is a front elevation of the complete machine.

Fig. 2 is a view on line 2—2 of Fig. 1.

Fig. 3 is a section on line 3—3 of Fig. 1, showing accumulator mechanism.

Fig. 4 is a view on line 4—4 of Fig. 3, showing staggered arrangement of accumulator elements.

Fig. 5 is a plan view on line 5—5 of Fig. 3, showing top view of accumulator, drive shafts, and cam contacts.

Fig. 6 is a plan, partly in section, on line 6—6 of Fig. 2, showing printing drum, type, etc.

Fig. 7 is an enlarged view of an accumulator element, showing transfer and total taking devices.

Fig. 8 is an enlarged view of the total taking device.

Fig. 9 is a view on line 9—9 of Fig. 7, showing clutch restoring mechanism.

Figs. 12 and 13 show different positions of transfer devices.

Fig. 14 shows the card feed clutch, the clutch magnet, and some of the cam contacts controlled by the magnet.

Fig 15 is a wiring diagram of the machine.

Fig. 16 shows the device which prevents repeating totals.

Figure 10:
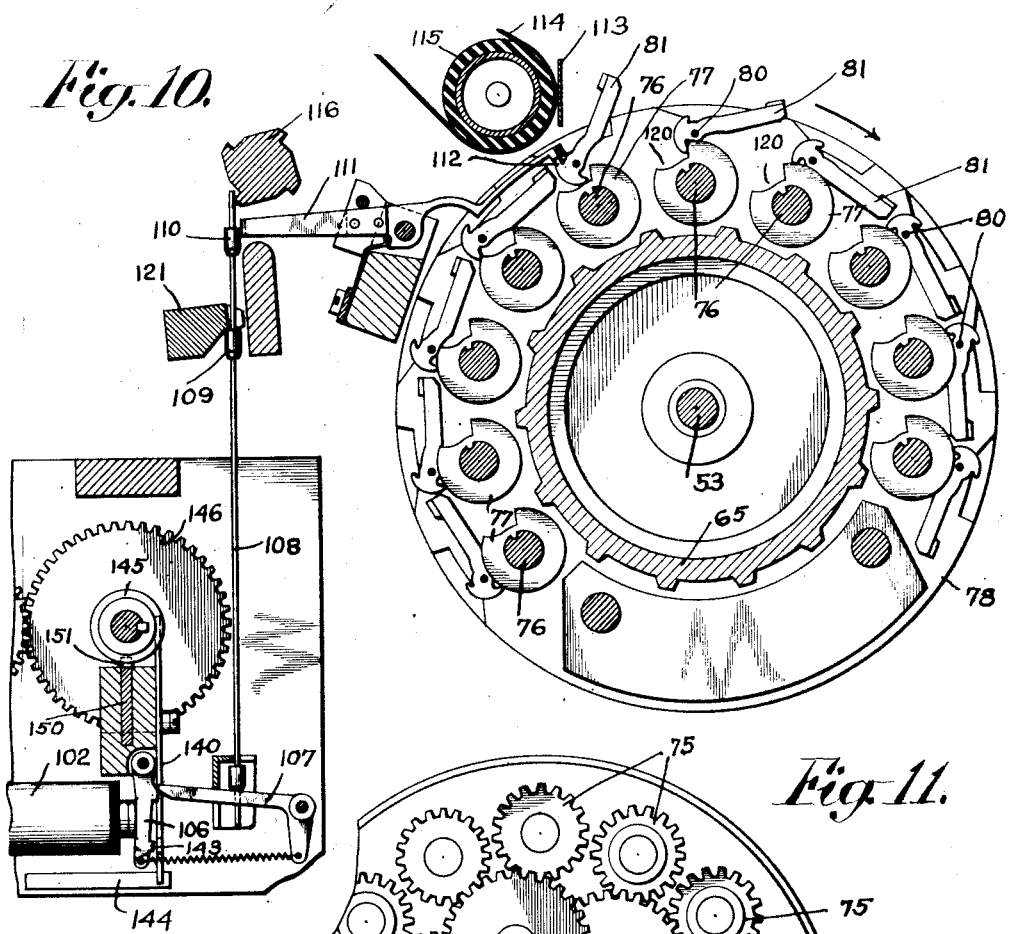
Fig. 10 is an enlarged view of the devices by which the accumulator elements control the type.

Like all apparatus of this kind my machine includes the usual and well known card feeding section shown to the left in Fig. 1, and diagrammatically in Fig. 15. This section includes an upper supply stack 30 from which the cards are taken one by one by a picker 31 and fed by rolls 33 to a discharge stack 34. During their passage through the feeding mechanism the cards pass between brushes 35 and contact blocks 36 (Fig. 15), and when perforations are reached circuits are completed therethrough to control the setting of other devices as will hereinafter be described. The passing cards swing back card lever 37 and close contacts 40. Drive of the tabulator is secured from the usual motor TM which drives main drive shaft 43 by the belt and pulley shown in Fig. 1. Shaft 43 by a pinion drives a spur gear 44, fast to shaft 45 (Fig. 5). In alignment with shaft 45 and extending to the left is a shaft 46 which drives the card feeding devices. This shaft may be clutched to rotate in unison with gear 44 by means of a clutch device 47 which is of the one-revolution type and is magnetically controlled by clutch magnet 300 as will later be explained.

Shaft 45 extends to the right and drives the printing section of the machine. Fast on shaft 45 is a bevel gear 48 which through bevel gear 49 drives vertical shaft 50. On the upper end of shaft 50 is a bevel gear 51 (Figs. 2 and 6) which drives bevel gear 52, fast on drum shaft 53. Drum shaft 53 carries spur gear 54 which, through idler gear 55, drives gear 56 fast to shaft 57. Bevel gear 59 on shaft 57 drives vertical shaft 60 through bevel gear 61 fast on its upper end. Fast on shaft 60 are a plurality of worm wheels 62, one for each accumulator, and by worm gears 62 the accumulator shafts 63 are driven, through the worm wheels 64 mounted thereon (Figs. 2 and 4).

Figure 11:
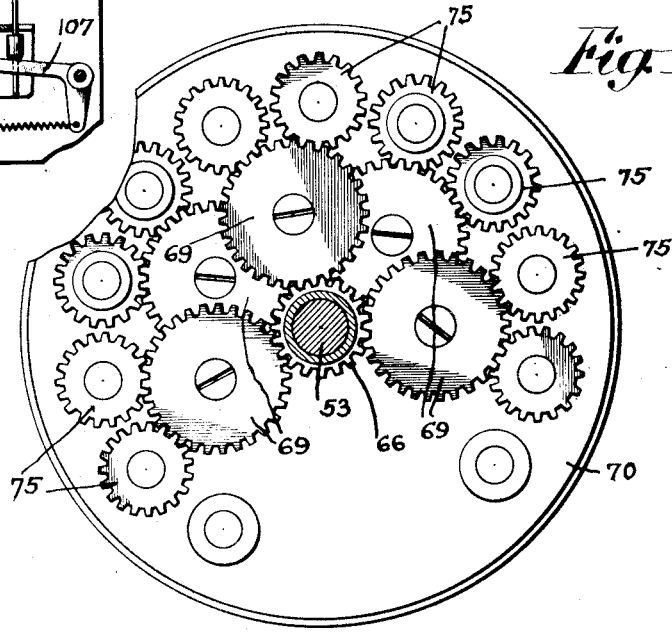
Fig. 11 shows the gearing on end of printer drum.

At the opposite end of printing drum 65, from driving gear 52, is a pinion 66 which is fixed against rotation by the pin 67 through shaft bearing 68 fast to the frame of the machine (Figs. 6 and 11). Meshing with pinion 66 are a number of gears 69 rotatably mounted on studs carried by the drum end plate 70. These gears 69 in turn mesh with pinions 75 fixed on shafts 76. Shafts 76 are splined to receive the controlling cams 77 (Figs. 6 and 10). There is one cam 77 on each shaft 76 for each column of index positions on the card. The cams are spaced apart by annular plates or rings 78 which surround the drum and are secured thereto. Plates 78 are drilled to accommodate shaft 76, and are also drilled to receive pivot wires 80.

These wires 80 provide pivotal support for type bars 81. There are ten pivot wires 80 and each wire has a type bar mounted thereon between each pair of plates 78. All type on one wire are alike, and there are 45 type on each wire, one for each of the 45 index columns on the card. Spaced about the periphery of the drum as shown in Fig. 10 are ten sets of type bars (one for each digit) 81 and ten sets of corresponding cams 77.

Each type bar 81 corresponds to a digit position in a given index column and there is a corresponding type bar for each of all the other digit positions in said column and other columns. The timing of the drive of the parts is such that the printing drum makes one revolution for each passing card, or in other words one revolution each card cycle. The type bars 81 are so positioned on the drum that a type bar corresponding to a certain digit value, say 7, passes a fixed point always at the time that the corresponding index perforation, say the 7 point, passes under the brush at the contact line. Means is provided for calling into action a type bar 81 when its index point perforation passes under the controlling brushes. This means will now be described.

The energization of a magnet 102 under the control of the perforation in the card is adapted to attract its armature 106 and release the spring latch 107. (Figs. 3 and 10). Cooperating with each spring latch 107 is a so-called call wire 108 which extends upwardly to a point at one side of the printing drum. These call wires are guided for vertical movement and at their upper ends are provided with two collars 109 and 110. With the latter collar a spring retained hook member 111 is adapted to cooperate. When the call wire 108 is elevated by the release of latch 107 the hook member is thrown clockwise into engagement with a hook end 112 on type bar 81. The rotation of the printing drum is clockwise as shown by the arrow. The engagement of the hook swings the selected type bar 81 rapidly in a counter-clockwise direction and the momentum of the type bar is sufficient to impact the type carried by the bar against the ribbon 113 and effect printing of the type upon the paper 114 carried by platen 115. At the time of this printing action the hook 111 is disengaged from the hooked end 112 of the type bar. Such disengagement is effected by means of the knockoff cam 116 which is provided with projections cooperating with the ends of call wires 108. Cam 116 is gear driven.

During the printing operation the cam 77 is turned to a position to bring its recess 120 under the tail of the type bar 81 and thereby permit the free swing of the type bar. This position is shown in Fig. 10 in the cam nearest the platen. Immediately after the printing operation cam 77 will have turned counter clockwise sufficiently to have contacted against the tail of the type bar and start the restoring of the type bar to its normal tangential position, in which position all type bars are locked at all times except when notch 120 comes under the tail of the type bar at printing position.

After the call wires have actuated 111 and hooked the type bars provision is made for restoring the call wires to their normal lower positions and relatching the spring latches 107 in their armatures 106. This restoration is effected by restoring bail 121 which acts against collar 109 on the call wire. This operation will be more fully explained later.

The paper feed is effected once every card cycle by cam 130 on shaft 53 acting through bell crank 131 and dog 132 on ratchet 133 (Figs. 2 and 6) which is fast on the shaft which carries platen 115. A ribbon feeding device of conventional design is used but not illustrated.

I have above described how the perforations in the record cards serve to cause the actuation of the printing mechanism of my machine and thereby print on the listing sheet the amounts derived from the cards. I shall now explain how those same amounts are totaled in the accumulators at the same time they are being printed, and how those totals are subsequently printed. The cycle of operation through which an amount is added from record cards in the manner of the present invention is known as the Hollerith cycle and the mechanism and the operation involved in such a cycle will now be explained.

There is a counter magnet 102 for each call wire 108, and cooperating with each magnet 102 is a clutch lever 140 (Figs. 4, 7, and 9), pivoted at 141. In normal position projection 142 on lever 140 bears against projection 143 of armature 106 so that the lower end of lever 140 is held to the right against the pressure of spring contacts 144. These springs are insulated from the machine and are in the circuit with magnet coil 102. When magnet 102 is energized armature 106 is drawn against the magnet and the lower end of lever 140 is thereupon released from catch 143 and is pushed to the left by spring contacts 144. This movement opens spring contacts 144 and breaks the magnet circuit.

Levers 140 at their upper ends engage the grooves of sliding clutches 145, mounted on and turning with shaft 63 which is driven as already explained. These clutches on one side have teeth that are carried into engagement by the shifting of lever 140, with teeth on gears 146, free on shaft 63, and in gear with register wheels 147 on register shaft 148.

Clutches 145 and levers 140 are restored to normal position by sliding plate 150 having projections 151 which engage the grooves in the clutches. Plates 150 are pressed to the right by springs 152, but are forced to the left twice each revolution of shaft 63 by cams 153 on the side of disc 154. There are two cams 153, one of which actuates the plate 150 after the adding operation, and the other after the carrying or transferring operation. When plate 150 is thus forced to the left the projections 151 force the clutches out of engagement and as the clutches move to the left they move the bottom ends of levers 140 to the right until projections 142 on the levers are latched again by projections 143 of the armatures, and contacts 144 are again closed.

Simultaneously with the action of cams 153 on plates 150, pins 156 and 157 on the printing drum (Fig. 3) contact with arm 158 which is connected by link 159 to restoring bail 121, and push the call wires 108 downwards after the adding and carrying operations respectively. Thus spring latch 107 and clutch lever 140 are simultaneously latched in normal position by armature 106 after each adding and carrying operation.

When a magnet 102 is energized by the circuit through the card perforations, clutch 145, as above described, engages gear 146 and turns it together with its corresponding register wheel 147. The time of engagement of a clutch on shaft 63 depends upon the position of the hole in the card that caused such engagement, and consequently the corresponding register wheel will be turned through an arc proportionate to such time. In other words, if the hole in the card represents the numeral 5 the register wheel will be turned five digit spaces. If it started from zero the number it will display is 5, but should it start from some other number, say, seven, the number it will display is 2, but by means of the transfer mechanism it will have moved the wheel of next higher order one digit space. The transfer devices will now be explained. (Figs. 7, 12, and 13.)

Each register wheel 147 has secured to it, and alongside of it, on shaft 148 a cam 165 which has projections of different heights 166 and 167. Pivoted at 168 is a lever 169 having a spring 170 which keeps the nose 171 of the lever 169 in contact with cam 165. Lever 169 at 172 engages the end of bell crank 173 which is pivoted at 174. While 171 travels on the concentric portion of cam 165 lever 173 is not affected, but when the register wheel 147 indicates 9, raised portion 166 comes under 171 and depresses the other end of lever 169 with the result that the vertical insulated portion 175 of lever 173 is moved to the left. When the register wheel is advanced another digit space the highest point 167 of the cam comes under 171 and moves 175 to the left still further.

The right side of 175 has three steps 176, and normally upon the top (first), and on the lower (third), steps rest the ends of two spring contacts 177 and 178 respectively, which are insulated from each other and from the frame. Above the entire row of contacts is a bail 180 of insulating material, carried by arms 181 of a frame pivoted at 182. This bail is rocked by a cam 185 (Fig. 2) through follower 186, arm 187 pivoted at 188, arm 189, link 190, and arm 191. Shafts 182 of all the four banks of counters are rocked in unison by the vertical link 192. Cam 185 has a concentric or normal portion, a raised portion above the normal, and a depressed portion below the normal.

The bail 180 has notches in its lower edge as indicated at 193, and each contact 178 has a narrow end that fits into a notch, while the lower contacts 177 are full width for their entire length and span the notches.

During each revolution of shaft 148 the concentric portion of cam 185 retains the bail in its normal position while the adding portion of the cycle is being effected, after which the bail is lowered to effect the transfer or carry over, then the bail is lowered below the normal to permit the stepped end plate 175 to return to its normal position, allowing contacts 177 and 178 to rest upon their respective steps 176, and then the bail is raised to its normal position. During each revolution of the register wheel the stepped end plate 175 is shifted from its normal to two other positions to the left. By its movement into the first of these positions contact 177 is released from the top step, and by its second movement the contact 178 is unlatched from the third step.

Normally the contacts 177 and 178 occupy the positions shown in Fig. 7, contact 177 resting close to the edge of the first step of plate 175, and contact 178 resting well on the edge of the third step. As the register wheel turns and indicates 9, the lower of the two raised portions 166 of cam 165 comes under 171, and the plate 175, being shifted, unlatches contact 177 and permits it to drop onto bail 180 which is at this time in its normal position. The parts are then in the positions shown in Fig. 12, so long as the bail 180 is not moved, as it will not be during the adding part of the cycle. If by the further movement of one digit space of the register wheel the digit 0 is indicated, then the highest point 167 of the cam 165 shifts plate 175 another step to the left and unlatches contact 178 from the third step, so that both contacts 177 and 178 rest on the bail as shown in Fig. 13.

Figs. 12 and 13 illustrate the end of the adding portion of the cycle, the register wheel in Fig. 12 indicating 9 and in Fig. 13 indicating 0.

In addition to the contacts already described there is a set of stationary upper contacts 195, connected to a common bar, and so placed that contact 178 may contact with 195 under certain conditions.

It will be seen that if the bail be raised in Fig. 12, contacts 177 and 178 will close, contacts 178 and 195 being kept out of contact by the third step of 175. In Fig. 13 if the bail be raised contacts 178 and 195 will close, while contacts 177 and 178 are kept apart by the middle step of 175.

In other words, when the bail is raised contacts 178 and 195 close in all cases involving transfer, while contacts 177 and 178 close in all cases when their wheels indicate nines. Assuming that the adding operation has been completed and the clutches thrown out by restoring plates 150, the carrying operation can be understood by reference to the lower half of diagram Fig. 15.

Assuming in the bottom set of contacts in the diagram that 178 and 195 are closed, while in the middle set of contacts 177 and 178 are closed, all other contacts being open. When carry-cam contacts 200—201 close a circuit is established as follows:—from right side of line through cam contact 201, line 202, common bar 203, lowest wire 204, contacts 195—178, wires 205, 206, 207, 208, and 209, thus energizing middle magnet 102. As the middle set of contacts 177—178 are closed a circuit is also provided from 208 through 177—178, middle wire 205, upper wires 206, 207, 208, and 209, energizing the upper magnet 102. When the middle and upper magnets 102 are energized their clutches 145 are thrown in and their register wheels are advanced one digit space, after which all clutches are knocked out by restoring plates 150, as previously explained. It will be understood that in the embodiment of my invention herein disclosed, the sets of contacts described above are on different register units. That is to say, if the bottom set of contacts in Fig. 15 represents hundreds they are in the third accumulator from the top. Then the middle set of contacts represents thousands and is in the bottom accumulator, while the upper set of contacts represents ten thousands and is in the upper accumulator. The entire carrying and transferring operation is more fully explained in Lake Patent 1,372,965, which, however, covers only the arrangement when all the accumulator elements are on the same shaft.

I have described in detail a transferring operation from a lower to a higher order of digit, but this transfer apparatus may be used for transferring from higher to lower orders, as in subtracting, by simply making the proper wire connections.

The total-taking devices will now be described. Associated with each register element 147 and revolving with it on shaft 148 is a stepped cam 220 (Fig. 8), each step representing a digit, as indicated. Parallel with and adjacent to each shaft 148 is a rock shaft 221, and fast to each shaft 221 is a frame 222. Loosely mounted on shaft 221 are the feeler fingers 223, provided with adjusting screws 224 in their free ends. There is one finger 223 for each cam 220. These fingers are connected to their frames 222 by springs 225. When a total is to be taken, shafts 221 and frames 222 are rocked clockwise. The feeler fingers follow the frames, remaining in contact therewith until screws 224 come into contact with the stepped cams 220. Then the frame continues its rocking movement while the fingers remain stationary.

Attached to each finger and insulated therefrom is a curved contact member 226. Behind this contact member 226 are blade contacts 227 and 228, the former being carried by a common bar 230, attached to and insulated from the frame 222, and the latter being supported by an insulated bar 231. Upon the downward rocking of the fingers 223 the blade contacts 227 will remain out of contact with the curved contact surface 226 until the feeler fingers are arrested. Immediately thereafter, as the frame 222 continues to move, contact is made between 227 and 226 and thence to blade contact 228 which is always in contact with 226. These parts thus constitute a means for timing the closure of the circuits to the printer magnets 102 when a total is to be printed, as is more fully explained in Lake Patent No. 1,379,268, of May 24, 1921, and copending application of Lake, Serial No. 639,153, filed May 15, 1923.

The total-taking shafts 221 are rocked by total cam 240 (Fig. 2) through follower 241, bell crank 242, link 243, bell crank 244, vertical link 245, and horizontal arms 246.

When the operator wishes to print a total he depresses total key 250 (Figs. 1 and 15), which energizes accumulator shaft control magnet 251 and total magnet 252 (Figs. 2 and 15).

When magnet 251 is energized it actuates its armature 253, which by means of arm 254 engages the upper end of dog 255 and unlatches the dog from the accumulator shaft clutch 256, which unlatching, stops the accumulator shaft 60 while the total is being taken. When magnet 252 is energized it actuates its armature 258, which by means of arm 259 releases dog 260 which is then drawn by spring 261 into engagement with clutch 262 (Figs. 2 and 5). Arms 254 and 259 are both equipped with anti-rebound devices of familiar type.

Gear 265 turns freely on shaft 266 and is driven continuously by gear 267 on shaft 45, gear 265 making one revolution for every two revolutions of gear 267, or in other words, 265 makes one half turn every card cycle. Clutch 262 is fast to gear 265. Dog 260 is pivoted on disc 268 which is integral with cam 240. This means that when dog 260 engages clutch 262, cam 240 and disc 268 revolve with gear 265. During the first half revolution cam 240 rocks the total taking shafts 221 as already explained, the appropriate magnets 102 are energized at the proper times, the corresponding spring latches 107 are released, their call wires actuated, and the digits representing the total standing on the accumulators are printed on the record sheet.

Magnets 102 during the above total taking operation are energized through a circuit traced as follows;—from left side of line (Fig. 15) through resistance 270, magnet 102, line 209, contacts 144, wire 271, wire 272, total taking contacts 226, wire 273, cam contacts P—2 to right side of line.

During the second half revolution of gear 265 the reset operation is carried out during which the accumulators are all cleared and set back to zero, as will now be explained. Shaft 266 carries a disc 274 having teeth cut in half its circumference. Gear 275, mounted on shaft 148 of the lowest accumulator, engages with disc 274 and is equipped with a guide plate 278 of well known type, so that gear 275 makes one revolution during the second half revolution of gear 265 but stands still during the first half revolution.

All shafts 148 are equipped with worm gears 279 each in mesh with a gear 280 on vertical shaft 281, so when gear 275 turns all shafts 148 turn simultaneously, and slots 282 (Fig. 8) engage dogs 283, one on each register wheel, so that all the register elements are set to zero in the well known manner while gear 275 is making its revolution.

During the total taking and resetting operation roller 285 on the lower end of arm 187 (Fig. 2) rides on the circumference of disc 268, rocking bail shafts 182 and thereby holding contacts 177 and 178 in lowered position so that the steps on plate 175 will be free to assume their proper normal positions. At the end of the reset cycle roller 285 resumes its normal position in recess 286 thereby permitting bails 180 to also resume their normal positions.

With the total taking mechanism described up to this point, if the operator holds down the total key 250 too long cam 240 will continue to revolve. I therefore provide a device that prevents cam 240 making more than one revolution at a time. That is, it can make one revolution as above described, and then cannot make another revolution until the card feed mechanism has been in operation. This device will be understood by reference to Figs. 5, 15, and 16. Magnet 290 is in the card feed circuit and is therefore energized whenever the card feed magnet 300 is energized. When magnet 290 is energized it picks up its armature 291 which is thereupon latched by spring latch 293, closing contact 294, and allowing current to flow from total key 250 through contact 294 to total control magnet 296 so long as 294 is closed. At the end of the reset revolution of gear 275 pin 295 in the face of the gear, contacts with the upper end of latch 293, forcing it to the right and releasing armature 291 which breaks contact 294. Contact 294 cannot be remade until magnet 290 is again energized upon the initiation of card feed operation.

It is also necessary to prevent operation of the total taking mechanism while the card feed is in operation. This is accomplished as shown in Fig. 14 and 15. When card feed magnet 300 is energized and its armature 301 actuated, finger 302, rigidly connected to the armature, opens spring contact 303, and as 303 is in the total taking circuit it is impossible to start a totaling cycle until magnet 300 is denergized. In other words, totaling and card feeding cannot be going on at the same time.

During the printing of a total armatures 106 are actuated, releasing spring latches 107 and clutch levers 140. After the total is printed, latches 107 are restored in the usual manner by restoring bail 121, but clutch levers 140 are not restored as usual by plate 150 because shafts 63 are not running. To restore the clutch levers I provide the following (Figs. 2 and 5):—on the face of disc 274 is a cam 306 so placed that as disc 274 revolves with gear 265 the cam contacts with roller 307 on arm 308. Arm 308 is fast on vertical shaft 309 which has an arm 310 for each accumulator above the lowest one, so placed that when shaft 309 is rocked by cam 306, arm 308 at the lowest accumulator and arms 310 at the other three accumulators contact with the ends of their corresponding restoring plates 150 which extend through the sides of the accumulators for this purpose. The actuation of the plates 150 occurs simultaneously with the actuation of spring latches 107, consequently latches 107 and levers 140 are relatched at the same time by armatures 106.

Contact cams A—1, P—2, and P—5 are carried on total shaft 266, while cams T—1, T—2, T—3, T—4, T—5, and C—3 are on card feed shaft 46 (Figs. 5 and 14).

A—1 breaks the circuit at the end of the reset cycle at such time that the machine will stop at D position.

P—2 controls the circuit from the printing magnets and total contacts.

P—5 is open during the total taking, thus preventing the starting of the tabulator during that operation.

T—1 provides that the machine stops at D position after stop key 312 is depressed.

T—2, T—3 and T—4, T—5 are the conventional make and break cams for adding and carrying, respectively, which prevent arcing at the brushes.

C—3 cam holds the circuit to the end of the cycle if the lower card lever or card feed control break contact.

When line switch 315 is closed current is supplied to both sides of the machine circuit from the outside source.

When start key 320 is depressed a circuit is formed as follows:—from left side of line through magnet 290, stop key 312, card feed magnet 300, card feed series relay 325, cam contact P—5, start key 320, and binding post 330 to right side of line.

The start key is held depressed by the operator until a card has reached card lever 37, whereupon the start key is released and a circuit is established from left side of line through resistance 335, counter control magnet 340, card feed counter magnet 345, card lever contact 40, through make and break contacts T—2, T—3 and binding post 330 to right side of line.

The energization of counter control magnet 340 provides a brush circuit from left side of line through magnet 102, contacts 144, wire 271, wires 350, brushes 35, armature of magnet 340, contacts T—2, T—3 to right side of line as before.

The energization of card feed series relay magnet 325 and the card feed control magnet 345 provides a card feed stick circuit through the armatures of said magnets from left to right sides of line through binding post 330.

Thus far in my description I have assumed that the digits representing an amount are accumulated on successive wheels and printed by the corresponding successive type. If it be desired to space any pair of digits further apart than usual, all that is necessary is for the operator to plug his wires as shown in the above mentioned copending Bryce application Serial No. 721,504. For instance, in Fig. 15 we have assumed that the bottom element represents hundreds, the middle one thousands, and the upper element ten thousands. If the operator wants to leave an extra wide space between the hundreds and thousands positions on the printed record, he will remove the upper end of lower wire 206 from plug socket 400 and insert it in plug socket 410 in place of the wire now there, and he will connect the thousands brush wire 350 to the upper magnet circuit by plugging the left end of wire 420 into socket 430 in place of the wire now there. Then the middle accumulator element will be dead, the upper element will be the thousands wheel, and there will be an extra space between the hundreds and thousands digits on the record sheet. Wire 272 should also be disconnected to prevent any attempted total printing operations by the dead element.

Fig. 15 shows the wire connections when the totals are to be printed in the same columns as the listed items. If the operator wishes to print the totals in some other field he may do so by removing the right hand ends of wires 440 from plug sockets 450 and plugging them to the sockets 450 corresponding to the columns in which he wants the totals to appear.

I claim—

1. In a record controlled accounting machine, an accumulator comprising a plurality of entry retaining accumulator elements one for each denominational order on each of a plurality of shafts, the elements on each shaft being in staggered relationship to the elements on the other shafts.

2. In a record controlled accounting machine, an accumulator comrising a plurality of entry retaining accumulator elements one for each denominational order on each of a plurality of shafts, and devices for transferring from an element on one shaft to an element on another shaft.

3. In a record controlled accounting machine, an accumulator comprising a plurality of elements on each of several adjacent shafts, and type for printing; each of said accumulator elements being aligned with one of said printing type.

4. In a record controlled tabulator, an accumulator comprising a plurality of elements on each of several shafts, and rotatable printing means including type; each printing type being aligned with one of said accumulator elements.

5. In a record controlled tabulator, an accumulator comprising a plurality of units on each of several shafts, and a plurality of printing type coordinated to said accumulator units, each of said type being controlled by its coordinated unit of the accumulator.

6. In a record controlled tabulator, an accumulator comprising a plurality of units on each of several shafts, transfer devices from units on one shaft to units on other shafts adapted to form a plurality of said units into an accumulator, means for controlling the entry of items into said units, and means controlled by the aforesaid means for printing the items which are derived from the records and entered upon said units.

7. The invention set forth in claim 6 in which the printing means comprises a rotatable type carrier.

8. In a record controlled tabulator, an accumulator comprising a plurality of units on each of several shafts, transfer devices from units on one shaft to units on other shafts, means for controlling the entry of items from the records into said units, and means for printing data, said printing means being controlled by the aforesaid last mentioned means for printing data from the records, and being controlled by the last mentioned means and from said units in printing totals from the accumulator.

9. In a record controlled tabulator, means to analyze the records, an accumulator comprising a plurality of units on each of several shafts, means for printing on a data sheet items derived from the records, and means adapted to bring about the printing of the items in any desired column on the data sheet.

10. In a record controlled tabulator, a plurality of independent accumulator units adapted to be selectively interconnected to form complete accumulators each of which comprises any number of elements, differential mechanism to add on said units items derived from the records, and means adapting any group of any number of said units to add from any corresponding group of columns on the records regardless of the location of the group of columns on the records.

11. In a record controlled accounting machine, means for sensing items on the records, magnetically controlled means for accumulating totals of the items, and magnetically controlled rotatable means for printing the totals, said accumulating and printing means being both controlled by a single magnet.

12. An accumulator comprising a plurality of accumulator elements rotating upon different axes, and with certain of said elements on a common axis to provide for the lateral compactness of the entire accumulator and differential mechanism independently associated with each of said elements for entering items thereon.

13. In an accounting machine, in combination, a series of accumulator elements arranged on a plurality of shafts, an individual differential mechanism for each element, means for rendering any of said differential mechanisms ineffective and its corresponding element inactive, devices for transferring between active elements and around the ineffective differential mechanisms, a rotary drum with type carriers movable relative to the drum, and means for controlling operations of the type carriers from said transfer elements.

14. In an accounting machine, in combination, a series of accumulator elements, an individual differential mechanism for each element, means for rendering any of said differential mechanisms ineffective and its corresponding element inactive, devices for transferring between active elements and around the ineffective differential mechanisms, a rotary drum with type carriers movable relative to the drum, and means for controlling operations of the type carriers from said transfer elements.

15. A record controlled tabulating machine driven by a single motor, including, in combination, a printing device driven continuously, an accumulating device, a total taking device, means for simultaneously declutching the accumulating device and clutching the total taking device whenever a total is to be taken, and means for clutching the accumulating device and declutching the total taking device after the total has been taken.

16. The invention set forth in claim 15, in which automatic means controlled by the total taking device are provided for the clutching and declutching operations at the end of total taking.

17. In a record controlled tabulating machine, means for feeding records, means for accumulating items from the records, means for effecting a total-printing cycle, and means for thereafter preventing another total-printing cycle until said feeling means has been actuated.

18. In a record controlled tabulating machine, means for feeding records, means for accumulating items from the records, means for effecting a total-printing cycle, and magnetically controlled means for thereafter preventing another total-printing cycle until said feeding means has been actuated.

19. In a record controlled accounting machine, means for sensing amounts on the records, means including electric transfer devices for accumulating totals of the amounts on accumulator elements, a continuously rotatable printing mechanism, and means for printing the totals standing upon accumulator elements while the rotatable printing means is rotating.

20. In a record controlled accounting machine, means for sensing amounts on the records while they are in motion, means including rotary differential clutching devices for accumulating totals of the amounts on accumulator elements, and rotatable mechanism for printing the totals standing on said elements.

21. In a record controlled accounting machine, in combination, means comprising elements adapted for operation upon the Hollerith cycle for accumulating totals of items from the records, and rotatable type carrying means for printing the totals.

22. In a record controlled accounting machine, in combination, means comprising elements adapted for operation upon the Hollerith cycle for accumulating totals of items from the records, and rotatable type carrying means for printing the items and totals thereof.

23. In a record controlled accounting machine, in combination, means comprising elements adapted for operation upon the Hollerith cycle for accumulating totals of items from the records, and magnetically controlled rotatable type carrying means for printing the items and totals thereof.

24. A rotary drum and means for driving it, a plurality of circumferentially arranged series of type on said drum, a plurality of parallel shafts, an accumulator having some of its accumulating elements on each of said shafts, devices for effecting transfers from any lower to any higher order of accumulating elements to set up totals on said accumulator, and means controlled by the accumulator for printing said totals by means of the aforesaid type while said drum is rotating.

25. An accumulator mechanism comprising in combination with a plurality of shafts, a plurality of entry retaining accumulator elements, one element for each denominational order of the complete accumulator, disposed upon each shaft; the plurality of elements upon one shaft being disposed in staggered relation to the plurality of elements which are disposed upon another shaft, and a group of all of said elements upon a plurality of said shafts together constituting one complete accumulator.

In testimony whereof I hereto affix my signature.

JAMES W. BRYCE.